G. W. SMITH.
FOUR-WHEEL DRIVE MECHANISM.
APPLICATION FILED AUG. 30, 1919.
1,386,967.
Patented Aug. 9, 1921.
2 SHEETS—SHEET 1.
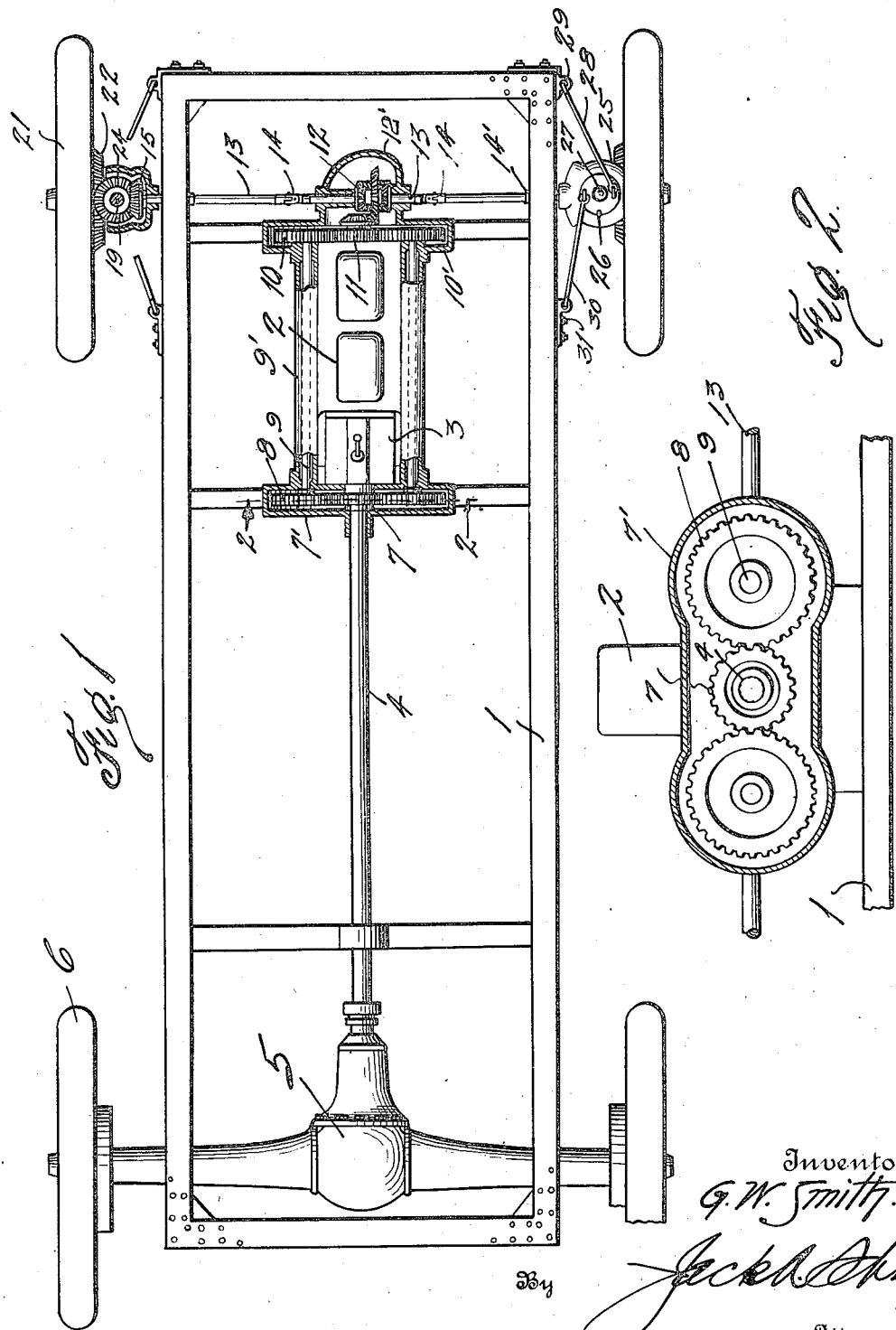

UNITED STATES PATENT OFFICE.

GEORGE W. SMITH, OF DALLAS, TEXAS.

FOUR-WHEEL DRIVE MECHANISM.

1,386,967. Specification of Letters Patent. Patented Aug. 9, 1921.

Application filed August 30, 1919. Serial No. 320,766.

*To all whom it may concern:*

Be it known that I, GEORGE W. SMITH, a citizen of the United States, residing at Dallas, in the county of Dallas and State of Texas, have invented certain new and useful Improvements in Four-Wheel Drive Mechanisms, of which the following is a specification.

This invention relates to new and useful improvements in four wheel driving mechanisms.

The object of the invention is to provide a vertical and central drive for the front wheels, whereby the latter are free to swing and easy to steer without interfering with the transmission of power thereto. Also the aim is to transmit power to each front wheel at the same rate of speed as it is transmitted to the rear wheels.

Another feature is to provide a brace for each front wheel vertical shaft whereby the latter is held in vertical alinement while the car is in motion and the wheels are moving up and down owing to the unevenness of the road.

Figure 3:
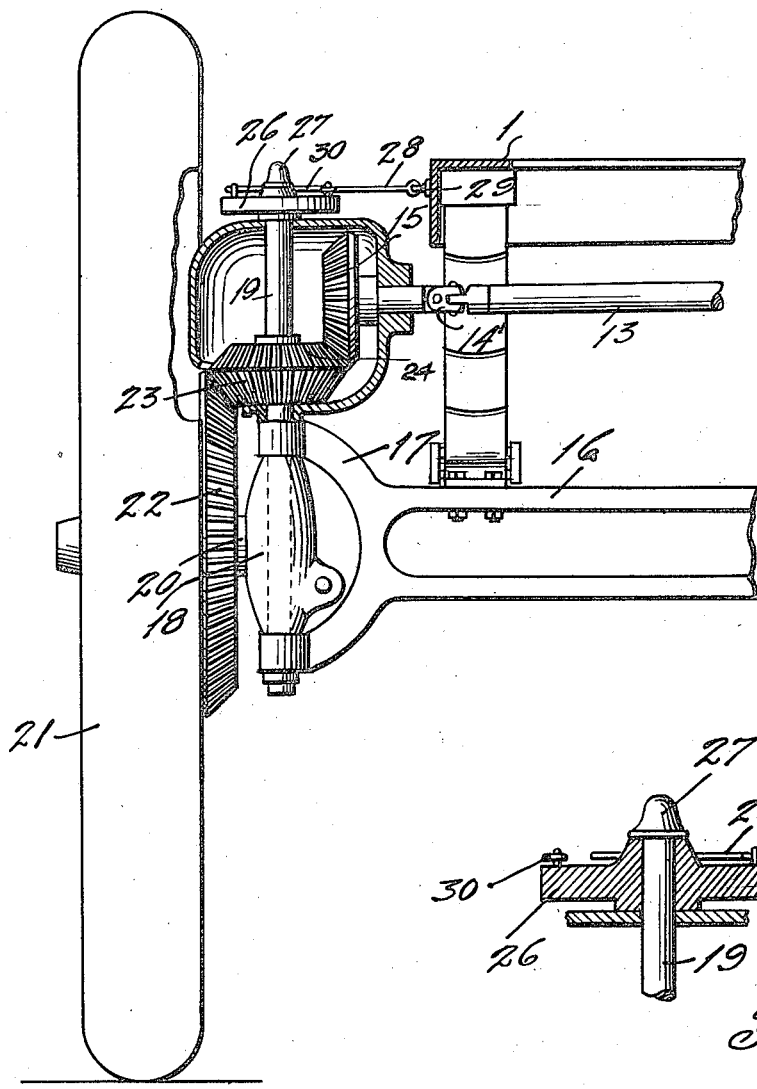
Figure 4:
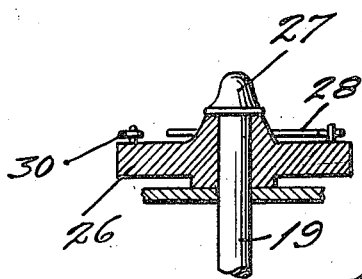

The invention will be more readily understood from a reading of the following specification and by reference to the accompanying drawings, in which an example of the invention is shown, and wherein:

Figure 1 is a plan view of a motor vehicle frame, running gear and motor, constructed in accordance with my invention, Fig. 2 is a transverse sectional detail on the line 2—2 of Fig. 2, Fig. 3 is a detail of the driving mechanism for one of the front wheels, and Fig. 4 is a sectional detail of one of the braces.

In the drawings the numeral 1 designates the frame of a motor vehicle, 2 the motor, 3 the transmission, 4 the propeller shaft, 5 the rear differential, and 6 the rear wheels, all of which is of the usual construction. On the propeller shaft 4 in rear of the transmission 3, a pinion 7 is fastened so as to revolve therewith. This pinion drives gears 8 on each side and these gears are secured on the ends of parallel shafts 9 extending forward on each side of the motor in tubular casings 9' and having gears 10 secured on their forward ends. The gears 10 mesh with and drive a pinion 11 disposed therebetween in front of the motor. The rear gears and pinion being of the same size as the front gears and pinion it is obvious that the front pinion 11 will be driven at the same rate of speed as the propeller shaft 4; all speed ratios set up by the transmission being transmitted to the pinion 11 the same as to the shaft 4. The rear gears are inclosed in a housing 7' attached to the casings 9' while a similar housing 10' attached to the forward ends of said casings, inclose the forward gears.

The pinion 11 is connected with and drives a differential gearing 12 mounted in a housing 12'. Drive shafts 13 extend from each side of the gearing and include universal joints 14 and 14'. Each shaft is free to revolve independently of the other and carries on its outer end a vertical miter gear 15. The usual front axle 16 is employed and has a yoke 17 at each end receiving a spindle body 18 confined on a vertical shaft 19 mounted in the yoke.

The usual spindle 20 extends from the body and is mounted in a front wheel 21 at each side of the frame. To the inner side of each front wheel a bevel gear 22 is fastened and this bevel gear is driven by a bevel pinion 23 fastened to the back of a miter pinion 24 which is driven by the gear 15. Each pair of pinions 23 and 24 are mounted on one of the shafts 19 which extends upward from the yoke and passes through a housing 25 inclosing the gear 15 and pinions 23 and 24. It will be seen that the line of mesh of the gears 15, pinions 23 and 24 and gears 22 is coincident with the vertical axes of the front wheels and directly over the center longitudinal axis of the axle; thereby giving a central vertical drive for each front wheel. By this arrangement the front wheels may be readily swung without strain or difficulty and the use of universal joints is a great advantage. By means of the differential 12 each front wheel may be independently driven and short turns are easily made.

On the upper end of each shaft 19 a disk 26 is confined by a nut 27. From each disk a link 28 extends forward to a bracket 29 secured to the front end of the frame; while a link 30 extends rearward from the opposite side of the disk and has its rear end pivoted in a bracket 31 secured to the side of the frame 1. The links are pivoted to each disk on opposite sides and in offset relation so as to permit the frame to move up and down and at the same time hold up the shaft 19 in line; this action being due to a slight rotation of the disk.

It will be seen that the device is simple and all parts are held in proper order. The central drive for each front wheel makes steering easy and obviates loss of power through transmission.

What I claim, is:

1. In a four wheel drive mechanism, the combination with a motor vehicle frame, a motor mounted on the frame, a transmission driven by the motor, and a propeller shaft driven by the transmission, of a train of gears driven by the propeller shaft, parallel forwardly directed shafts driven by said train of gears, a plurality of front gears driven by the parallel shafts, a front differential driven by the front gears, laterally extending drive shafts connected with the front differential, a bevel wheel drive on each side of the front of the frame and connected with one drive shaft, an axle under the drive shafts, and front wheels pivoted to the axle and driven by the bevel wheel drives.

2. In a four wheel drive mechanism, the combination with a motor vehicle frame, a motor mounted on the frame, a transmission driven by the motor, and a propeller shaft driven by the transmission, of a train of gears driven by the propeller shaft, parallel forwardly directed shafts driven by said train of gears, a plurality of front gears driven by the parallel shafts, a front gearing driven by the front gears, laterally extending drive shafts connected with the front gearing, a bevel wheel drive on each side of the front of the frame and connected with the drive shafts, an axle under the drive shafts, and front wheels pivoted to the axle and driven by the bevel wheel drives.

3. In a four wheel drive mechanism, the combination with a motor vehicle frame, a motor mounted on the frame, a transmission driven by the motor, and a propeller shaft driven by the transmission of a front differential gearing, means for transmitting motion to the differential at the same rate of speed as that of the propeller shaft, transverse drive shafts extending laterally from the front gearing, an axle supporting the front end of the frame, front wheels supporting the axle, vertical shafts extending upward from the pivots of the front wheels, bevel pinions mounted on the vertical shafts, bevel gears attached to the drive shafts and driving the pinions, and bevel gears carried by the front wheels and driven by the pinions.

In testimony whereof I affix my signature.

GEORGE W. SMITH.